ced in water, made acid with

UNITED STATES PATENT OFFICE.

WHITNEY B. JONES, OF NEWARK, NEW JERSEY, ASSIGNOR TO BUTTERWORTH-JUDSON CORPORATION, A CORPORATION OF NEW YORK.

BROWN DYESTUFF.

1,310,532.     Specification of Letters Patent.     Patented July 22, 1919.

No Drawing.     Application filed February 26, 1918. Serial No. 219,231.

*To all whom it may concern:*

Be it known that I, WHITNEY B. JONES, a citizen of the United States, residing in Newark, New Jersey, (and whose post-office address is C/o Butterworth - Judson Corporation, No. 61 Broadway, New York city, New York,) have invented certain new and useful Improvements in Brown Dyestuffs, of which the following is a specification.

My invention provides an improved brown dye stuff particularly useful for securing fast brown shades on wool and applicable to other materials. It is produced in the form of powder or paste containing various percentages of dye stuff.

The dye stuff of my invention is a dinitrohydroxyazo - alphanaphthylaminazo - salicylic acid. The particular feature of novelty is in the introduction of alphanaphthylamin (in which term I include such of its sulfonic acids as can be combined in this position) between the component molecules of picramic acid and salicylic acid, so that the compound molecule of the dye stuff will contain a naphthalene diamin residue in the middle position.

My improved dye stuff is made from picramic acid (4-6-dinitro-2-amido-1-phenol), alphanaphthylamin, and salicylic acid. A suitable method of manufacture is the following:

Twenty kilos of picramic acid are suspended in water cooled by ice. To this are added fifteen kilos of hydrochloric acid of twenty degrees Baumé. It is then diazotized in the usual manner with seven kilos of sodium nitrite. When diazotation is complete the diazo solution is run slowly with stirring into a cooled solution of 14.3 kilos of alphanaphthylamin in dilute hydrochloric acid. Sodium acetate is added and coupling starts immediately and is complete in about twelve hours. The insoluble blue intermediate product is filtered off and the paste suspended in water, made acid with fifteen kilos of hydrochloric acid and diazotized as usual with seven kilos of sodium nitrite. After stirring some hours the diazotation is complete and the diazo mixture is run slowly with stirring into a solution of salicylic acid in sufficient soda to keep the reaction mixture alkaline. After standing twelve hours the mixture is heated to eighty degrees centigrade and salted out and filtered.

The alphanaphthylamin referred to in the above process may be substituted by 24.5 kilos of Cleves' acid.

What I claim is—

1. The dye stuff or coloring matter hereinbefore described which is produced by the combination of the diazo compound of picramic acid with alphonaphthylamin, again diazotizing the amidoazo compound obtained and recombining the diazo compound obtained with salicylic acid and which has the following characteristics: dark brown paste or black-brown powder, slightly soluble in cold, very soluble in hot water, and is precipitated from solutions by mineral acids substantially as described.

2. A dye stuff or coloring matter containing alphanaphthylamin between component molecules of picramic acid and salicylic acid so that the dye stuff contains the naphthalene diamin residue in the middle position.

In witness whereof I have hereunto signed my name.

WHITNEY B. JONES.